United States Patent
Heitkamp

(10) Patent No.: US 7,000,049 B1
(45) Date of Patent: Feb. 14, 2006

(54) SYSTEMS AND METHODS FOR RELIABLY SELECTING BUS MASTERSHIP IN A FAULT TOLERANT MANNER

(75) Inventor: Ross Suydam Heitkamp, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 779 days.

(21) Appl. No.: 09/749,585

(22) Filed: Dec. 28, 2000

(51) Int. Cl.
*G06F 12/00* (2006.01)

(52) U.S. Cl. ............... 710/240; 710/241; 710/242; 710/243; 710/244; 710/113; 710/110

(58) Field of Classification Search ........ 710/240–244, 710/113, 110
See application file for complete search history.

(56) References Cited

U.S. PATENT DOCUMENTS

| | | | | |
|---|---|---|---|---|
| 5,553,248 A | * | 9/1996 | Melo et al. .................. | 710/116 |
| 6,189,061 B1 | * | 2/2001 | Katz et al. ................... | 710/110 |
| 6,253,269 B1 | * | 6/2001 | Cranston et al. ............. | 710/107 |
| 6,496,890 B1 | * | 12/2002 | Azevedo et al. ............. | 710/110 |
| 6,598,104 B1 | * | 7/2003 | Jaramillo et al. ........... | 710/110 |
| 6,622,191 B1 | * | 9/2003 | Nakamura .................... | 710/260 |
| 6,629,178 B1 | * | 9/2003 | Smith .......................... | 710/240 |
| 6,662,306 B1 | * | 12/2003 | Van Loo ..................... | 713/600 |
| 2002/0023186 A1 | * | 2/2002 | Kim ............................ | 710/244 |
| 2003/0084218 A1 | * | 5/2003 | Kondo et al. ................ | 710/107 |
| 2003/0115393 A1 | * | 6/2003 | Kim ............................ | 710/240 |
| 2004/0098525 A1 | * | 5/2004 | Wang et al. ................. | 710/110 |

* cited by examiner

*Primary Examiner*—Rehana Perveen
*Assistant Examiner*—Kim T. Huynh
(74) *Attorney, Agent, or Firm*—Harrity Snyder, LLP

(57) ABSTRACT

A system for selecting bus mastership in a multi-master system includes master devices and at least one slave device. The master devices generate control signals relating to bus mastership in the multi-master system. The slave device(s) receive the control signals from the master devices, determine whether a conflict exists based on the control signals, generate one or more alternate control signals for selecting bus mastership when a conflict is determined to exist, and select bus mastership using the one or more alternate control signals.

28 Claims, 6 Drawing Sheets

SYSTEMS AND METHODS FOR RELIABLY SELECTING BUS MASTERSHIP IN A FAULT TOLERANT MANNER

BACKGROUND OF THE INVENTION

A. Field of the Invention

The present invention relates generally to multi-master systems and, more particularly, to systems and methods for reliable and fault-tolerant selection of bus mastership.

B. Description of Related Art

A long-felt need in multi-master systems is determining which of several potential masters has control of the system. Conventional systems use different techniques to address this need. For example, a typical technique may include the assertion of a master signal by one of the masters to indicate mastership.

A problem common to these conventional systems is that failures, such as bent pins or burned out components, and spurious inputs due to noise, for example, can cause confusion as to mastership and possibly lead to disruptions in the operation of the system. For example, failures may cause multiple potential masters to assert mastership at the same time. This may cause confusion as to which of the potential masters is the true master.

As a result, there exists a need for systems and methods that facilitate the conveyance of mastership within a multi-master system such that no single point of failure or spurious input can disrupt the operation of the system.

SUMMARY OF THE INVENTION

Systems and methods consistent with the present invention address this and other needs by applying hysteresis to the mastership determination and providing an alternate control path when conflicts arise.

In accordance with the purpose of the invention as embodied and broadly described herein, a system for selecting bus mastership in a multi-master system includes master devices and at least one slave device. The master devices generate control signals relating to bus mastership in the multi-master system. The slave device(s) receive the control signals from the master devices, determine whether a conflict exists based on the control signals, generate one or more alternate control signals for selecting bus mastership when a conflict is determined to exist, and select bus mastership using the one or more alternate control signals.

In another implementation consistent with the present invention, a method for selecting a bus in a multi-bus system includes generating control signals relating to bus selection in the multi-bus system; determining whether a conflict for bus selection exists based on the control signals; generating one or more alternate control signals when a conflict is determined to exist; and selecting a bus using the one or more alternate control signals.

In yet another implementation consistent with the present invention, a slave device in a multi-master system having master devices and slave devices includes bus selection logic and conflict resolution logic. The bus selection logic determines whether control signals from the master devices indicate that two or more of the master devices concurrently assert bus mastership, generates a conflict indication signal when two or more of the master devices concurrently assert bus mastership, and selects bus mastership using one or more alternate control signals when two or more of the master devices concurrently assert bus mastership. The conflict resolution logic generates the one or more alternate control signals to identify bus mastership in response to the conflict indication signal.

In a further implementation consistent with the present invention, a method for selecting bus mastership in a multi-master system having a plurality of master devices and a plurality of slave devices, includes determining whether control signals from the master devices indicate that two or more of the master devices concurrently assert bus mastership; generating one or more alternate control signals to identify bus mastership when two or more of the master devices concurrently assert bus mastership; selecting bus mastership using the one or more alternate control signals when two or more of the master devices concurrently assert bus mastership; and selecting bus mastership using the control signals when one of the master devices asserts bus mastership.

In another implementation consistent with the present invention, a multi-master system includes master devices, conflict resolution logic, and slave devices. The master devices generate control signals relating to bus mastership. The conflict resolution logic receives the control signals from the master devices, determines whether the control signals indicate that two or more of the master devices concurrently assert bus mastership, and generates one or more alternate control signals when it is determined that two or more of the master devices concurrently assert bus mastership. The slave devices select bus mastership using the one or more alternate control signals when the control signals indicate that two or more of the master devices concurrently assert bus mastership.

In yet another implementation consistent with the present invention, a multi-bus system includes master devices and slave devices connected to multiple buses. Each of the master devices controls a corresponding one of the buses. The master devices generate control signals that indicate which of the buses is an active bus. The slave devices receive the control signals, determine whether the control signals indicate that two or more of the buses are declared active buses, and select one of the buses when the control signals indicate that two or more of the buses are declared active buses.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention provide mechanisms that prevent disruptions in the operation of a multi-master system due to failures and spurious inputs when resolving bus mastership.

In the description that follows, selection of a master device and/or bus will be described. It should be understood from the description that selection of a master device and bus are tied together. In other words, selection of a master device includes selection of the corresponding bus, and vice versa.

Exemplary System

Figure 1:
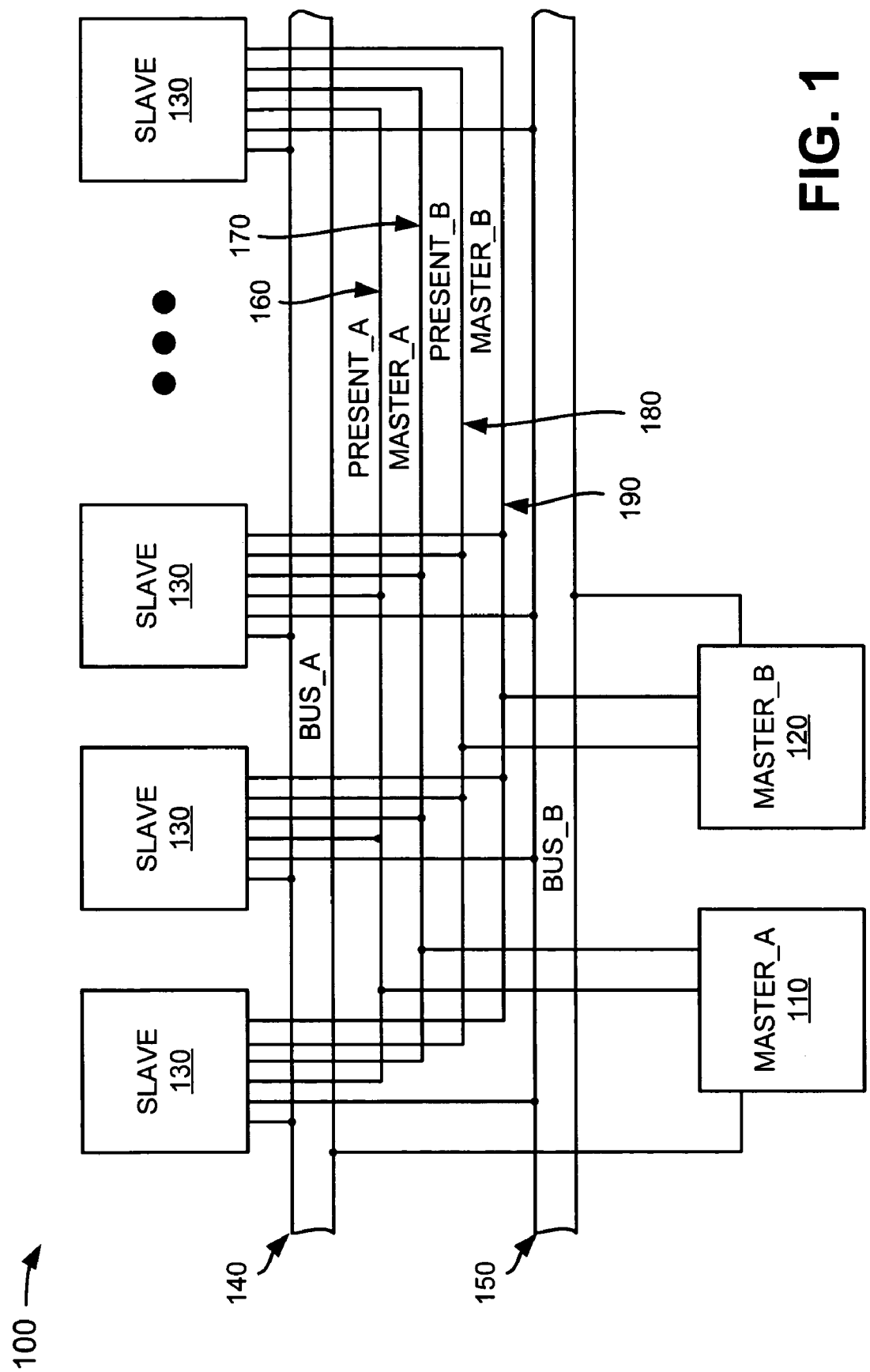
FIG. 1 is a diagram of an exemplary multi-master system in which systems and methods, consistent with the present invention, may be implemented.

FIG. 1 is a diagram of an exemplary multi-master system 100 in which systems and methods, consistent with the present invention, may be implemented. The system 100 may include master_A device 110 and master_B device 120 connected to one or more slave devices 130 via bus_A 140 and bus_B 150, respectively. Master devices 110 and 120 may use control signals, such as present_A signal 160, master_A signal 170, present_B signal 180, and master_B signal 190, to assert bus mastership (i.e., to identify to the slave devices 130 which bus 140 or 150 to use). The present signals 160 and 180 may indicate that the corresponding master device 110 and 120 is powered up and operating. The master signals 170 and 190 may indicate that the corresponding master device 110 and 120 declares itself the active master. The slave devices 130 may use the control signals 160–190 to determine which master device 110 or 120 is the active master and, thus, which bus 140 or 150 to use.

The master devices 110 and 120 may include devices, such as computers, controllers, etc., or components, such as microprocessors, microcontrollers, etc., that generate address, data, and/or control signals for transmission to the slave devices 130 over buses 140 and 150. During typical operation, one of the master devices 110 or 120 may operate as the active master and the other master device 120 or 110 may operate as a standby, non-active, master in the system 100. The master devices 110 and 120 may use conventional arbitration techniques to determine which is the active master. The buses 140 and 150 may include wired or optical conductors that facilitate the communication of address, data, and/or control signals among the master devices 1110 and 120 and the slave devices 130. Two master devices 110 and 120 and two buses 140 and 150 are shown in FIG. 1 for simplicity. In practice, the system 100 may include more master devices and buses.

The slave devices 130 may include devices with or without extensive computational capabilities, such as computers, processors, controllers, memory devices, input/output (I/O) devices, etc. The slave devices 130 may operate upon address, data, and/or control signals on the buses 140 and 150. The slave devices 130 may use the control signals 160–190 to determine which master device 110 or 120 is the active master and, thus, which bus 140 or 150 to use.

Figure 2:
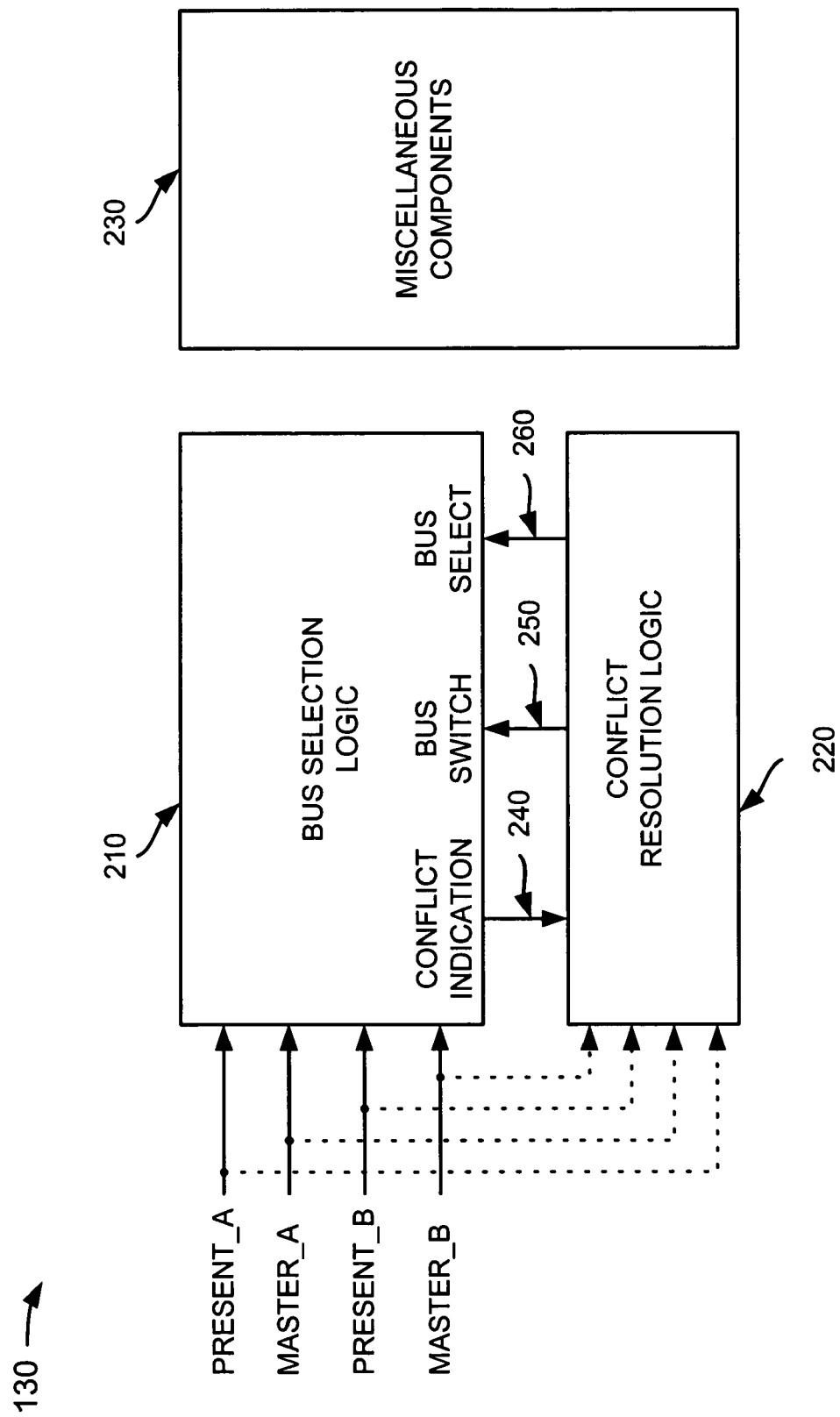
FIG. 2 is a detailed diagram of a slave device of FIG. 1 according to an implementation consistent with the present invention.

FIG. 2 is a detailed diagram of a slave device 130 according to an implementation consistent with the present invention. The slave device 130 may include bus selection logic 210, conflict resolution logic 220, and other miscellaneous components 230. The miscellaneous components 230 may include memory devices, I/O devices, processing devices, etc. The miscellaneous components 230 may connect to the bus selection logic 210 and conflict resolution logic 220 via a bus or other mechanisms (not shown).

The bus selection logic 210 may include a state machine, a combination of logic gates, a process or object, or similar logic or code, to identify the active master device and bus based on the values of certain control signals, such as the present signals 160 and 180 and the master signals 170 and 190. When conflicts in the control signals arise, the bus selection logic 210 may declare a "conflict" and send a conflict indication signal 240 to the conflict resolution logic 220. A conflict may arise, for example, when more than one master device 110 and 120 asserts bus mastership at the same time or when noise or failures make it appear that more than one master device 110 and 120 asserts bus mastership.

The conflict resolution logic 220 may include arbitration logic, such as a processor, a combination of logic gates, a process or object, or similar logic or code, that resolves conflicts. The conflict resolution logic 220 may use conventional arbitration techniques to identify the correct bus mastership configuration when conflicts arise. For example, the conflict resolution logic 220 may request the correct bus mastership configuration from the master devices 110 and 120, possibly via an alternate communications path.

The conflict resolution logic 220 may inform the bus selection logic 210 of its conflict resolution via control signals, such as a bus switch signal 250 and a bus select signal 260. The bus switch signal 250 may indicate whether a switch in bus mastership should occur. The bus select signal 260 may indicate which bus 140 or 150 to use and, hence, which master device 110 or 120 is to take over bus mastership, when the bus switch signal 250 indicates that a switch in bus mastership should occur. Based on these control signals 250 and 260, the bus selection logic 210 may identify the active bus and master device, as will be described in more detail below.

In an alternate implementation consistent with the present invention, the conflict resolution logic 220 may receive the present and master signals 160-190, as shown in FIG. 2, and identify conflicts itself when the signals 160–190 conflict. In this case, the bus selection logic 210 may or may not inform the conflict resolution logic 220 of the occurrence of conflicts. The conflict resolution logic 220 may use conventional arbitration techniques to resolve the conflict and inform the bus selection logic 210 of its decision via control signals, such as the bus switch and bus select signals 250 and 260. Based on the control signals 250 and 260, the bus selection logic 210 may identify the active bus and master device.

Figure 3:
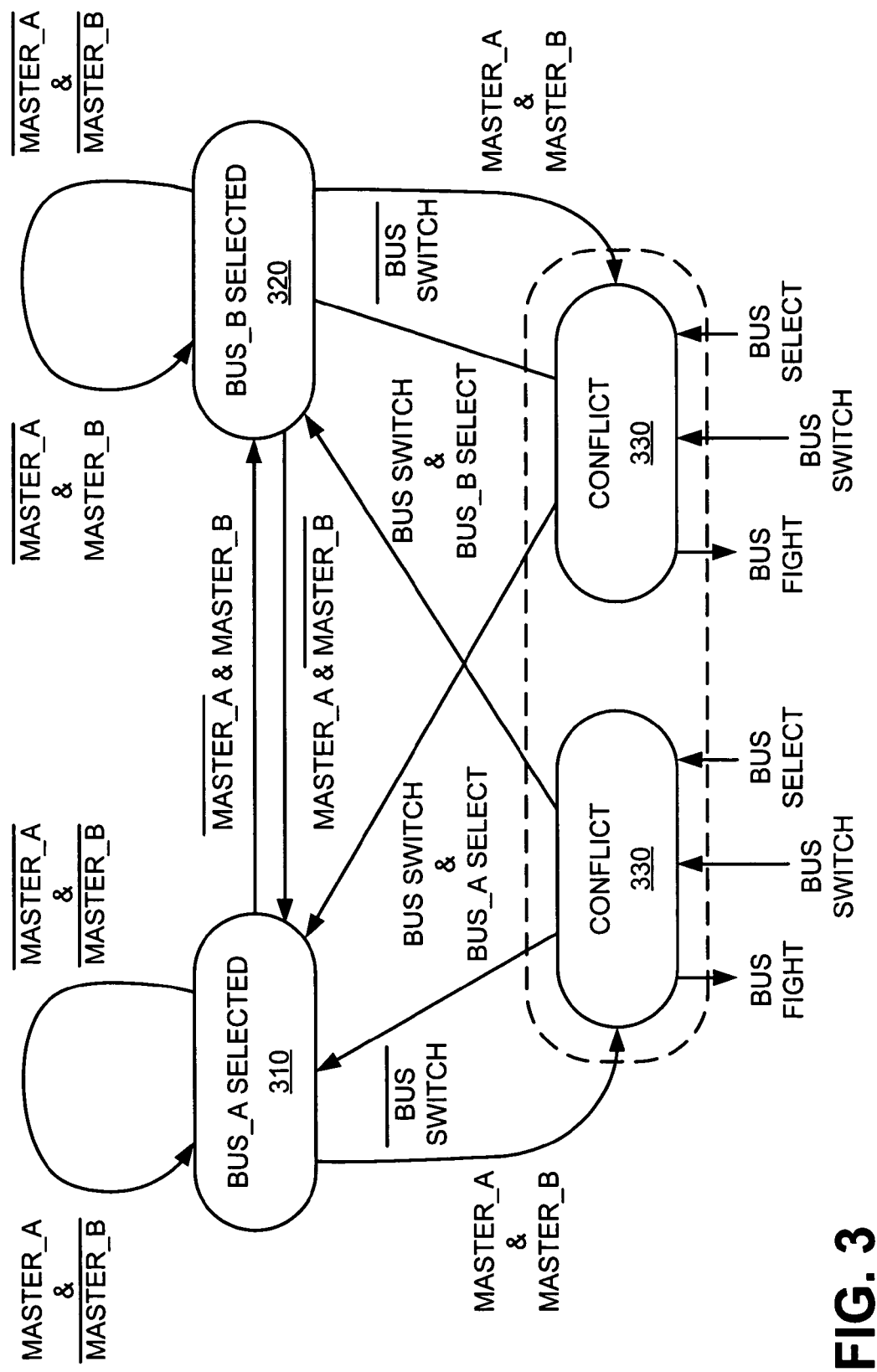
FIG. 3 is a detailed diagram of the state machine of FIG. 2 according to an implementation consistent with the present invention.

FIG. 3 is a detailed diagram of the bus selection logic 210 according to an implementation consistent with the present invention. When the system initially powers up, no bus 140 or 150 may be selected. In this case, the system 100 may select a default bus, such as Bus_A 140. Assume, for example, that Bus_A 140 is the default bus. Therefore, the bus selection logic 210 may enter state 310. From state 310, the bus selection logic 210 may enter state 320 or state 330 depending upon the values of the master signals 170 and 190 (i.e., MASTER_A and MASTER_B). The description that follows assumes that the values of the present signals 160 and 180 indicate that both master devices 110 and 120 are powered up and operating.

When the values of the master signals 170 and 190 indicate that neither master device 110 and 120 asserts bus mastership (e.g., /MASTER_A and /MASTER_B), then the buses 140 and 150 are idle. In this case, the bus selection logic 210 remains in state 310 and no change in bus mastership occurs. This provides hysteresis in the bus selection process to prevent spurious inputs and noise from causing an undesired switch in bus mastership. When the value of the master signal 170 indicates that the master device 110 asserts bus mastership and the value of the master signal 190 indicates that the master device 120 does not (e.g., MASTER_A and MASTER_B), then the bus selection logic 210 again remains in state 310 with no change in bus mastership. When the value of the master signal 170 indicates that the master device 110 does not assert bus mastership and the value of the master signal 190 indicates that the master device 120 does (e.g., /MASTER_A and MASTER_B), the bus selection logic 210 may transition to state 320 and select Bus_B 150.

When the values of the master signals 170 and 190 indicate that both master devices 110 and 120 assert bus mastership (e.g., MASTER_A and MASTER_B), then the bus selection logic 210 declares a conflict. This activates a backdoor from which selection of the correct bus mastership may be made. The bus selection logic 210 may then transition to state 330 and send a conflict indication signal 240 (FIG. 2) to the conflict resolution logic 220. The conflict resolution logic 220 may return a bus switch signal 250 and a bus select signal 260. While the conflict resolution logic 220 determines the correct bus mastership configuration, the bus selection logic 210 may maintain the previous bus mastership configuration until instructed otherwise. This provides additional hysteresis in the bus selection process to prevent spurious inputs and noise from causing an undesired switch in bus mastership.

When the bus switch signal 250 indicates that no bus switch is to occur (e.g., /BUS SWITCH), the bus selection logic 210 may return to the state from which it transitioned to the state 330. In this case, the bus selection logic 210 may return to state 310 with no change in the bus mastership configuration. When the bus switch signal 250 indicates that a bus switch should occur (e.g., BUS SWITCH), the bus selection logic 210 selects Bus_A 140 or Bus_B 150 based on the value of the bus select signal 260.

Assume that the bus select signal 260 indicates that Bus_B 150 should be selected (e.g., BUS_B SELECT), the bus selection logic 210 may transition to state 320 and select Bus_B 150. When the values of the master signals 170 and 190 indicate that neither master device 110 and 120 asserts bus mastership (e.g., /MASTER_A and /MASTER_B), then the buses 140 and 150 are idle. In this case, the bus selection logic 210 remains in state 320 and no change in bus mastership occurs. When the value of the master signal 170 indicates that the master device 110 does not assert bus mastership and the value of the master signal 190 indicates that the master device 120 does (e.g., /MASTER_A and MASTER_B), then the bus selection logic 210 again remains in state 320 with no change in the bus mastership. When the value of the master signal 170 indicates that the master device 110 asserts bus mastership and the value of the master signal 190 indicates that the master device 120 does not (e.g., MASTER_A and /MASTER_B), the bus selection logic 210 may transition to state 310 and select Bus_A 140.

When the values of the master signals 170 and 190 indicate that both master devices 110 and 120 assert bus mastership (e.g., MASTER_A and MASTER_B), then the bus selection logic 210 declares a conflict. The bus selection logic 210 may then transition to state 330 and send a conflict indication signal 240 to the conflict resolution logic 220 as described above.

The above processing may be summarized by the following table:

| MASTER_A | MASTER_B | BUS SWITCH | WHAT HAPPENS |
| --- | --- | --- | --- |
| 0 | 0 | X | No change to bus selection. |
| 0 | 1 | X | Bus_B selected. |
| 1 | 0 | X | Bus_A selected. |
| 1 | 1 | 0 | No change to bus selection. |
| 1 | 1 | 1 | Bus selection controlled by bus select signal. |

Exemplary Processing

Figure 4:
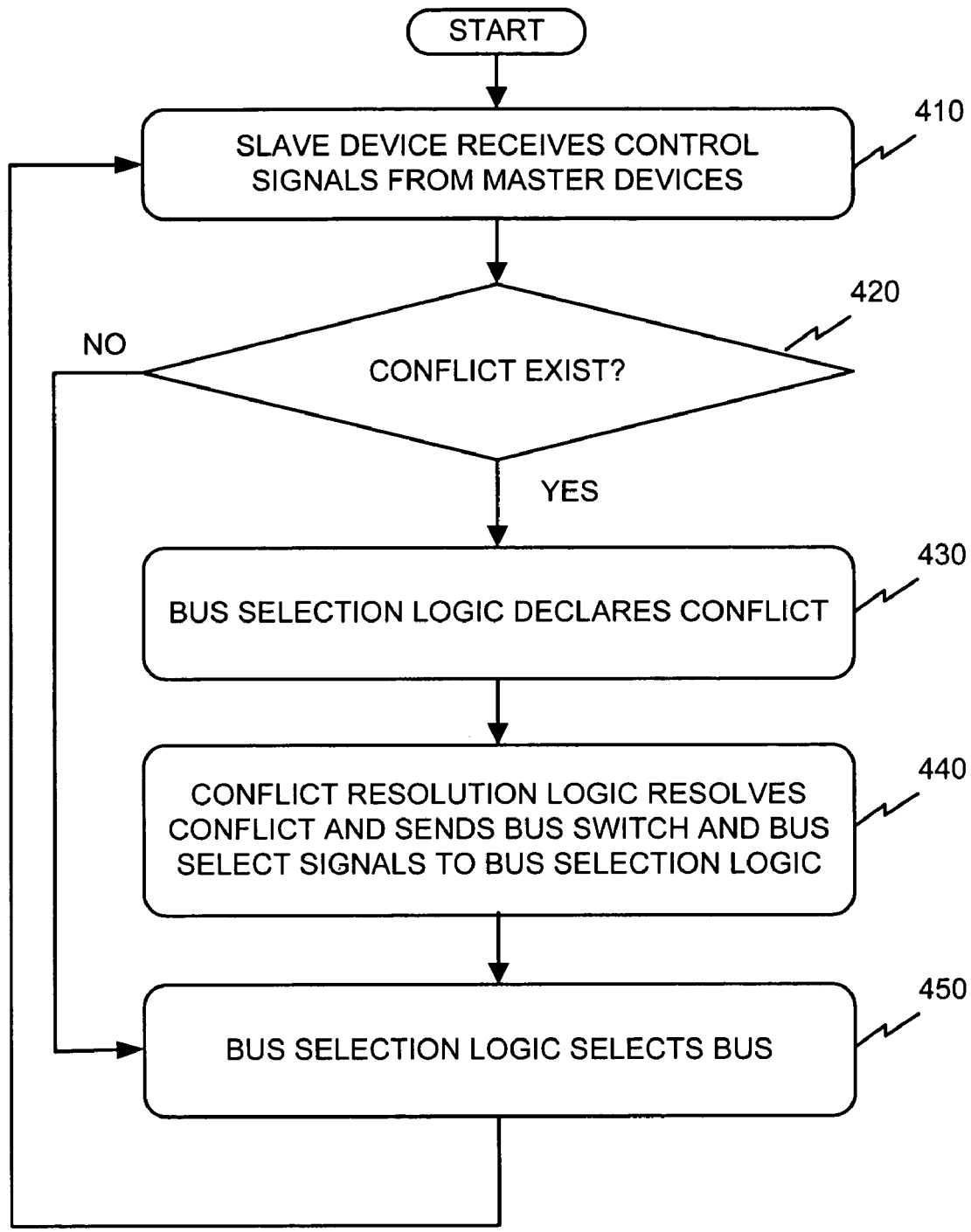
FIG. 4 is a flowchart of exemplary processing for determining bus mastership in accordance with an implementation consistent with the present invention.

FIG. 4 is a flowchart of exemplary processing for determining bus mastership in accordance with an implementation consistent with the present invention. Processing may begin after the system 100 (FIG. 1) powers up and the master devices 110 and 120 determine which will be the active master and which will be the standby master. The master devices 110 and 120 may use conventional arbitration techniques to make this determination. For example, one of the master devices may be declared the initial active master by default.

Once one of the master devices 110 or 120 has been declared the initial active master, the master devices 110 and 120 may transmit control signals, such as the present and master signals 160–190, to the slave devices 130 so that the slave devices 130 may determine which bus 140 or 150 to use. The slave devices 130 receive the present and master signals 160–190 from the master devices 110 and 120 [step 410]. The bus selection logic 210, and possibly the conflict resolution logic 220, within the slave devices 130 receives the present and master signals 160 190 and determines whether any conflicts exist [step 420]. For example, the bus selection logic 210 may determine whether the master signals 170 and 190 indicate that both the master devices 110 and 120 assert bus mastership. If this happens, the bus selection logic 210 may declare a conflict [step 430].

If a conflict exists, the bus selection logic 210 may transmit a conflict indication signal 240 to the conflict resolution logic 220 to inform the conflict resolution logic 220 of the existence of the conflict. The conflict resolution logic 220 may resolve the conflict using conventional arbitration techniques [step 440]. For example, the conflict resolution logic 220 may request the correct bus configuration from the master devices 110 and 120, possibly via an alternate communications path. The conflict resolution logic 220 may then generate control signals, such as the bus switch signal 250 and the bus select signal 260, to instruct the bus selection logic 210 as to which bus 140 or 150 to use. The conflict resolution logic 220 may then send the bus switch and bus select signals 250 and 260 to the bus selection logic 210 [step 440].

The bus selection logic 210 may select the bus 140 or 150 based on the bus switch and bus select signals 250 and 260

[step 450]. Processing may then return to step 410 where the slave devices 130 receive the present and master signals 160–190 from the master devices 110 and 120. If, after receiving the signals 160–190, the slave devices 130 determine that no conflicts exist [step 420], the bus selection logic 210 within the slave devices 130 select a bus 140 or 150 based on the master signals 170 and 190 [step 450]. Processing may then again return to step 410 where the slave devices 130 receive the present and master signals 160–190 from the master devices 110 and 120 and continue as described above.

Alternate Exemplary Systems

Figure 5:
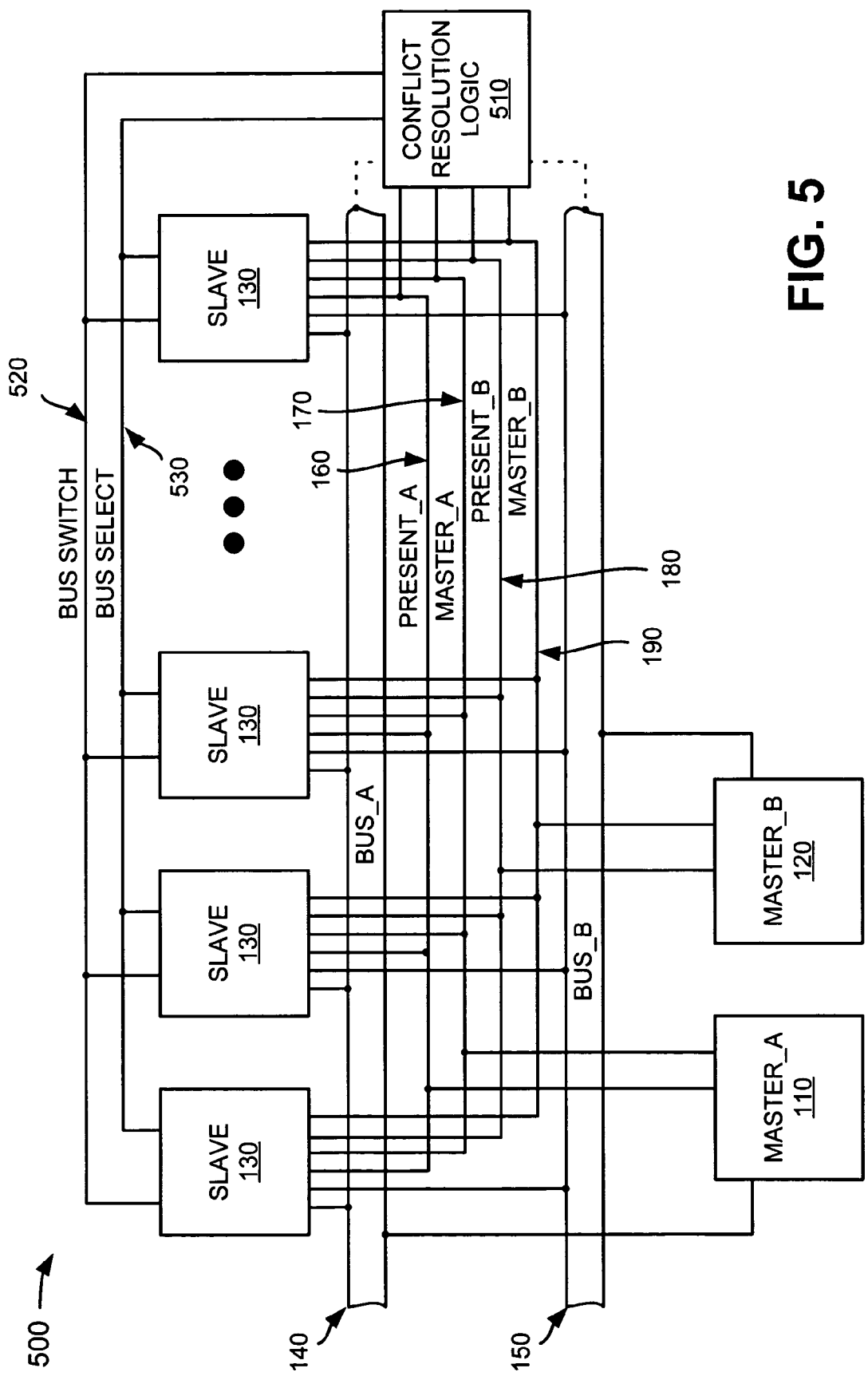
FIG. 5 is an exemplary diagram of an alternate system in which systems and methods, consistent with the present invention, may be implemented.

FIG. 5 is an exemplary diagram of an alternate system 500 in which systems and methods, consistent with the present invention, may be implemented. The system 500 may include a conflict resolution unit 510 in addition to the components and signals of the system 100 shown in FIG. 1. The conflict resolution logic 510 may include arbitration logic, such as a processor or a combination of logic gates, that resolves conflicts.

The conflict resolution logic 510 may monitor the values of control signals, such as the present signals 160 and 180 and the master signals 170 and 190, to identify conflicts. When the master signals 170 and 190 conflict (e.g., when the master signals 170 and 190 indicate that more than one master device 110 and 120 asserts bus mastership), the conflict resolution logic 510 may use conventional arbitration techniques to identify the correct bus mastership configuration. For example, the conflict resolution logic 510 may request the correct bus mastership configuration from the master devices 110 and 120, possibly via an alternate communications path. The conflict resolution logic 510 may inform the slave devices 130 of its decision via control signals, such as bus switch signal 520 and bus select signal 530. As described above, the slave devices 130 may use the bus switch and bus select signals 520 and 530 to identify the correct bus 140 or 150 to use when conflicts exist.

Figure 6:
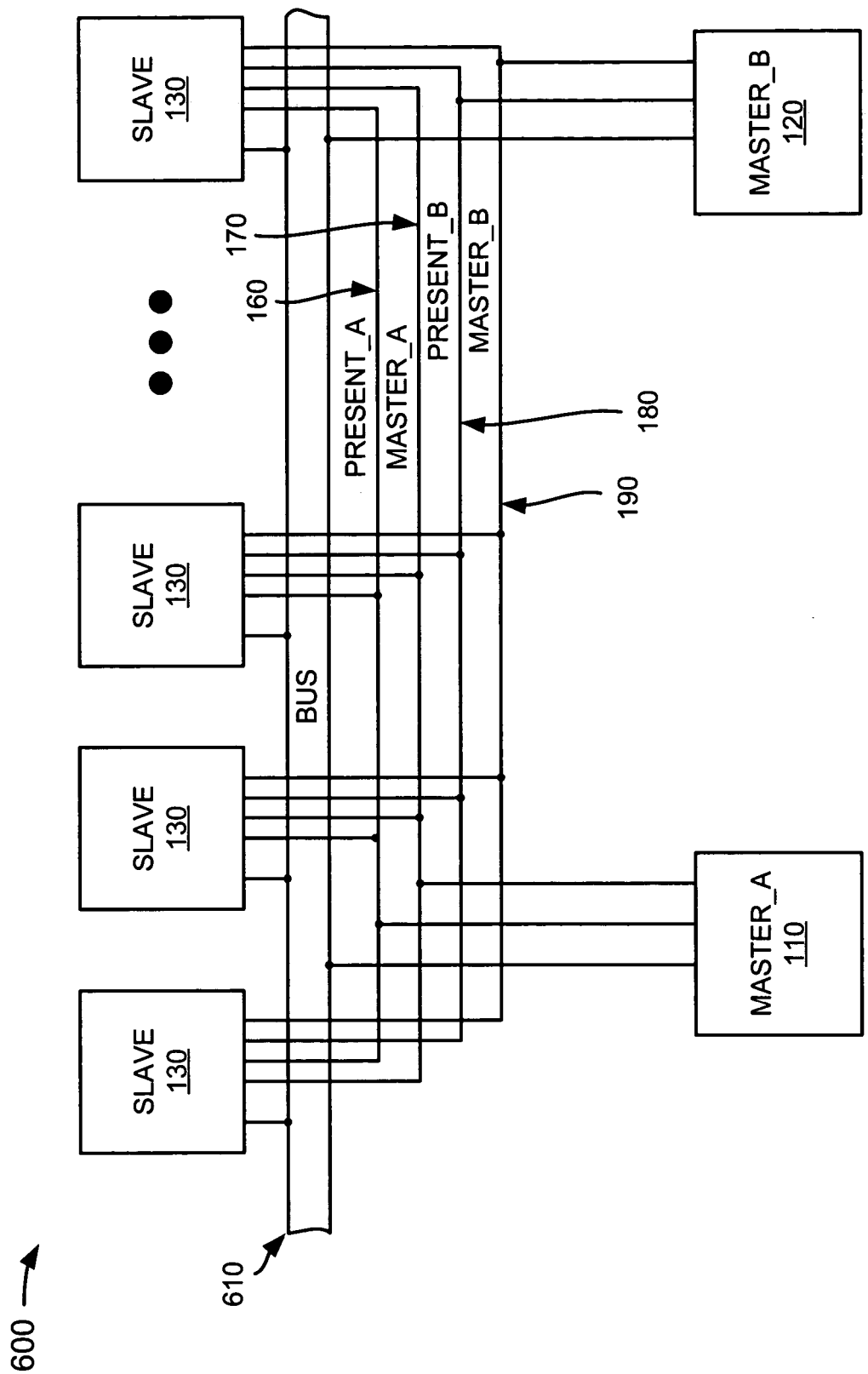
FIG. 6 is another exemplary diagram of an alternate system in which systems and methods, consistent with the present invention, may be implemented.

FIG. 6 is another exemplary diagram of an alternate system 600 in which systems and methods, consistent with the present invention, may be implemented. In the system 600, the master devices 110 and 120 control a single bus 610. During operation, one of the master devices 110 or 120 may control the operation of the bus 610 as the active master and the other master device 120 or 110 may operate as a standby, non-active, master in the system 600. In this implementation consistent with the present invention, the present signals 160 and 180 and master signals 170 and 190 indicate to the slave devices 130 which master device 110 or 120 currently has control of the bus 610. Conflicts in these signals 160–190 may be handled as described above with regard to the system 100 of FIG. 1.

CONCLUSION

Systems and methods consistent with the present invention provide mechanisms that provide hysteresis to avoid unintentional bus switches and a backdoor to improve operation under fault conditions.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A system for selecting bus mastership in a multi-master system, comprising:
   a plurality of master devices configured to generate control signals relating to control of a bus in the multi-master system; and
   a plurality of slave devices connected to the master devices via the bus, each of the slave devices being configured to:
      receive the control signals from the master devices,
      determine whether a conflict in the control signals exists,
      generate one or more alternate control signals for selecting bus mastership when a conflict is determined to exist, and
      determine which of the master devices obtains control of the bus using the one or more alternate control signals when a conflict is determined to exist.

2. The system of claim 1, wherein each of the slave devices comprises:
   bus selection logic configured to determine whether the control signals indicate that two or more of the master devices concurrently assert control of the bus and generate a conflict indication signal when two or more of the master devices concurrently assert control of the bus, and
   conflict resolution logic configured to generate the one or more alternate control signals in response to the conflict indication signal.

3. The system of claim 1, wherein the one or more alternate control signals include a bus switch signal that indicates whether a change in control of the bus is to occur and a bus select signal that indicates which of the master devices is to be granted control of the bus.

4. The system of claim 1, wherein each of the slave devices comprises:
   bus selection logic configured to determine whether the control signals indicate that none of the master devices asserts control of the bus and maintain a previous grant of control of the bus when none of the master devices asserts control of the bus.

5. The system of claim 1, wherein each of the slave devices is further configured to determine which of the master devices obtains control of the bus based on the control signals when no conflict is determined to exist.

6. The system of claim 1, wherein the control signals include a present signal that indicates whether a corresponding one of the master devices is operating and a master signal that indicates whether a corresponding one of the master devices asserts control of the bus.

7. The system of claim 1, wherein the control signals include a master signal that indicates whether a corresponding one of the master devices asserts control of the bus.

8. A system for selecting a master in a multi-master system, comprising:
   means for outputting first and second control signals relating to mastership in the multi-master system from each of a plurality of masters in the multi-master system;
   means for determining whether a conflict for mastership exists based on the first and second control signals;
   means for generating a switch signal and a select signal when a conflict is determined to exist; and
   means for selecting one of the masters using the switch signal and the select signal.

9. A method for selecting a bus in a multi-bus system, comprising:

generating control signals relating to bus selection in the multi-bus system;
determining whether a conflict for bus selection exists based on the control signals;
generating one or more alternate control signals when a conflict is determined to exist; and selecting a bus using the one or more alternate control signals.

10. The method of claim 9, wherein the determining includes:
determining whether the control signals indicate that two or more of the buses are to be selected concurrently, and
generating a conflict indication signal when the control signals indicate that two or more of the buses are to be selected concurrently.

11. The method of claim 10, wherein the generating one or more alternate control signals includes:
generating the one or more alternate control signals in response to the conflict indication signal.

12. The method of claim 9, wherein the one or more alternate control signals include a bus switch signal that indicates whether a change in bus selection is to occur and a bus select signal that indicates which of the buses is to be selected.

13. The method of claim 9, further comprising:
determining whether the control signals indicate that the buses are idle; and
maintaining a previous bus selection when the control signals indicate that the buses are idle.

14. The method of claim 9, further comprising:
selecting a bus using the control signals when no conflict is determined to exist.

15. The method of claim 9, wherein the control signals include a present signal that indicates whether a corresponding bus is operating and a master signal that indicates whether a corresponding bus is to be used.

16. The method of claim 9, wherein the control signals include a master signal that indicates whether a corresponding bus is to be used.

17. A computer-readable medium that stores instructions executable by one or more processors to perform a method for selecting a master in a multi-master system, comprising:
instructions for outputting a plurality of control signals relating to selection of a master from each of a plurality of masters in the multi-master system;
instructions for determining whether a conflict for selection of a master exists based on the control signals;
instructions for generating a switch control signal and a select control signal when a conflict is determined to exist; and
instructions for selecting one of the masters using the switch control signal and the select control signal.

18. In a multi-master system comprising a plurality of master devices connected to a plurality of slave devices, each of the slave devices comprising:
selection logic configured to determine whether control signals from the master devices indicate that two or more of the master devices concurrently assert mastership within the multi-master system, generate a conflict indication signal when two or more of the master devices concurrently assert mastership, and select mastership using one or more alternate control signals when two or more of the master devices concurrently assert mastership; and
conflict resolution logic configured to generate the one or more alternate control signals to identify mastership in response to the conflict indication signal.

19. The slave device of claim 18, wherein the one or more alternate control signals include a switch signal that indicates whether a change in mastership is to occur and a select signal that indicates which of the master devices is to be granted mastership.

20. The slave device of claim 18, wherein the control signals include a present signal that indicates whether a corresponding one of the master devices is operating and a master signal that indicates whether a corresponding one of the master devices asserts mastership.

21. The slave device of claim 18, wherein the control signals include a master signal that indicates whether a corresponding one of the master devices asserts mastership.

22. The slave device of claim 18, wherein the selection logic is further configured to select the mastership using the control signals when the control signals indicate that one of the master devices asserts mastership.

23. A method for selecting bus mastership in a multi-master system comprising a plurality of master devices connected to a plurality of slave devices via at least one bus, the method, performed by each of the slave devices, comprising:
determining whether control signals from the master devices indicate that two or more of the master devices concurrently assert bus mastership;
generating one or more alternate control signals to identify which of the master devices obtains bus mastership when two or more of the master devices concurrently assert bus mastership;
determining which of the master devices obtains bus mastership using the one or more alternate control signals when two or more of the master devices concurrently assert bus mastership; and
determining which of the master devices obtains bus mastership using the control signals when one of the master devices asserts bus mastership.

24. The method of claim 23, wherein the one or more alternate control signals include a bus switch signal that indicates whether a change in bus mastership is to occur and a bus select signal that indicates which of the master devices is to be granted bus mastership.

25. The method of claim 23, wherein the control signals include a present signal that indicates whether a corresponding one of the master devices is operating and a master signal that indicates whether a corresponding one of the master devices asserts bus mastership.

26. The method of claim 23, wherein the control signals include a master signal that indicates whether a corresponding one of the master devices asserts bus mastership.

27. A multi-master system, comprising:
a plurality of master devices configured to generate control signals relating to bus mastership;
conflict resolution logic configured to receive the control signals from the master devices, determine whether the control signals indicate that two or more of the master devices concurrently assert bus mastership, and generate a switch signal and a select signal when it is determined that two or more of the master devices concurrently assert bus mastership; and a plurality of slave devices configured to select bus mastership using the switch signal and the select signal when the control signals indicate that two or more of the master devices concurrently assert bus mastership.

28. A multi-bus system, comprising:
a plurality of buses;
a plurality of master devices corresponding to the buses, each of the master devices controlling a corresponding one of the buses, the master devices generating control signals that indicate which of the buses is an active bus; and
a plurality of slave devices connected to each of the buses and configured to receive the control signals, determine whether the control signals indicate that two or more of the buses are declared active buses, generate alternate control signals when the control signals indicate that two or more of the buses are declared active buses, and select one of the buses as the active bus using the alternate control signals.

* * * * *